Figure 1:
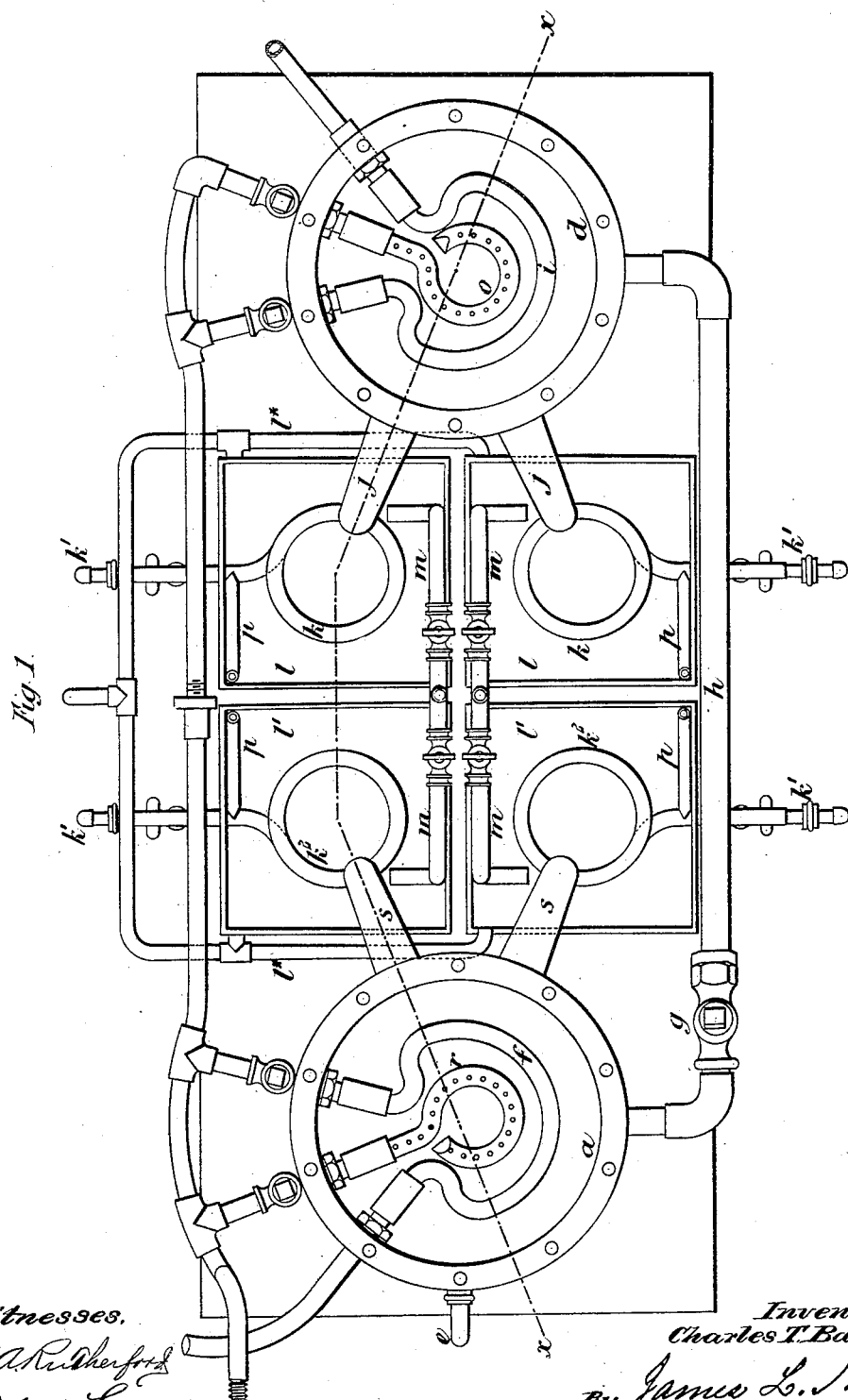

(No Model.) 3 Sheets—Sheet 1.

C. T. BASTAND.
PROCESS OF AND APPARATUS FOR EXTRACTING OILY AND GREASY MATTER FROM COTTON WASTE.

No. 245,765. Patented Aug. 16, 1881.

Witnesses,
J. A. Rutherford
Robert Garrett

Inventor:
Charles T. Bastand,
By James L. Norris.
Atty.

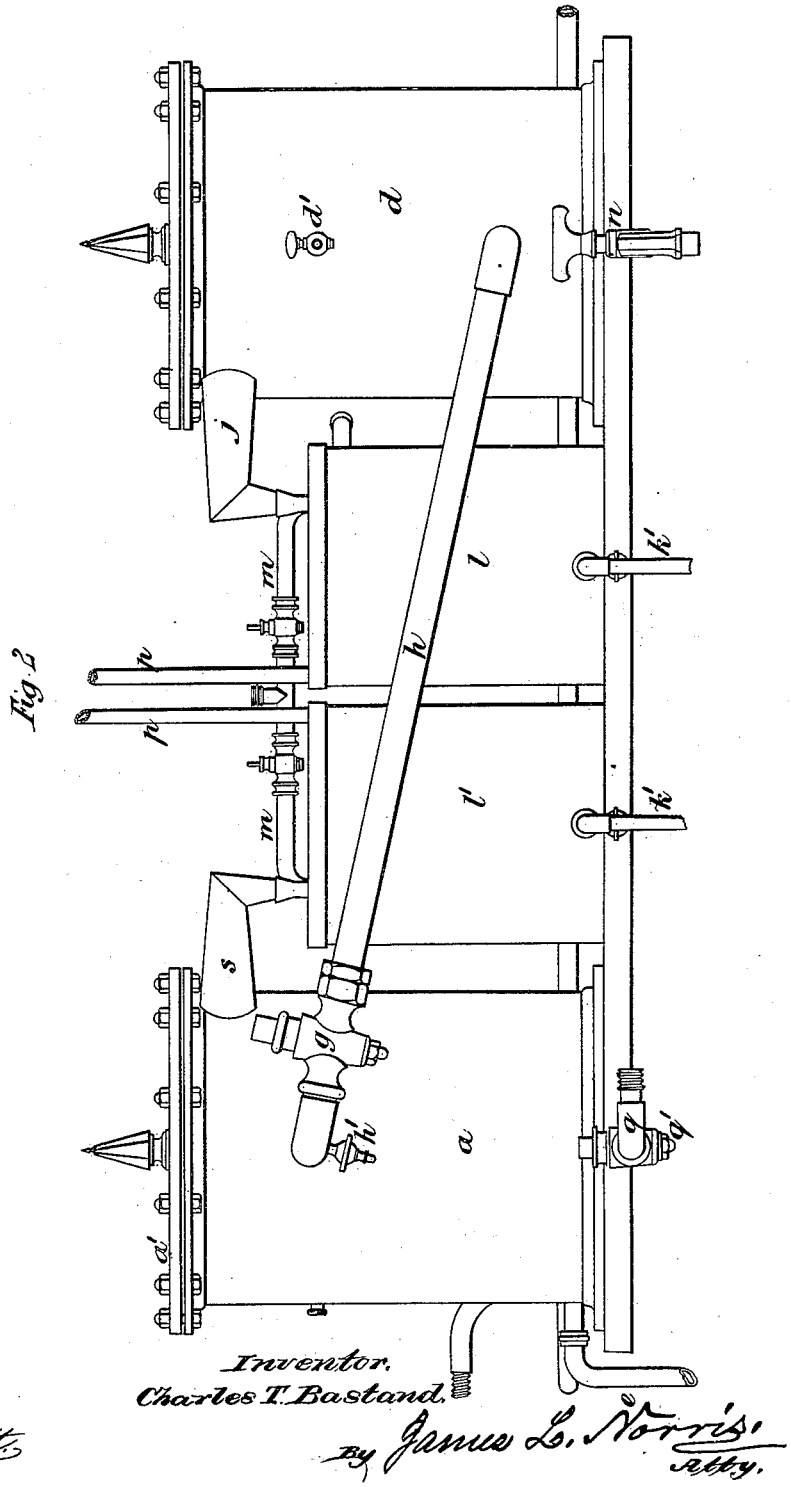

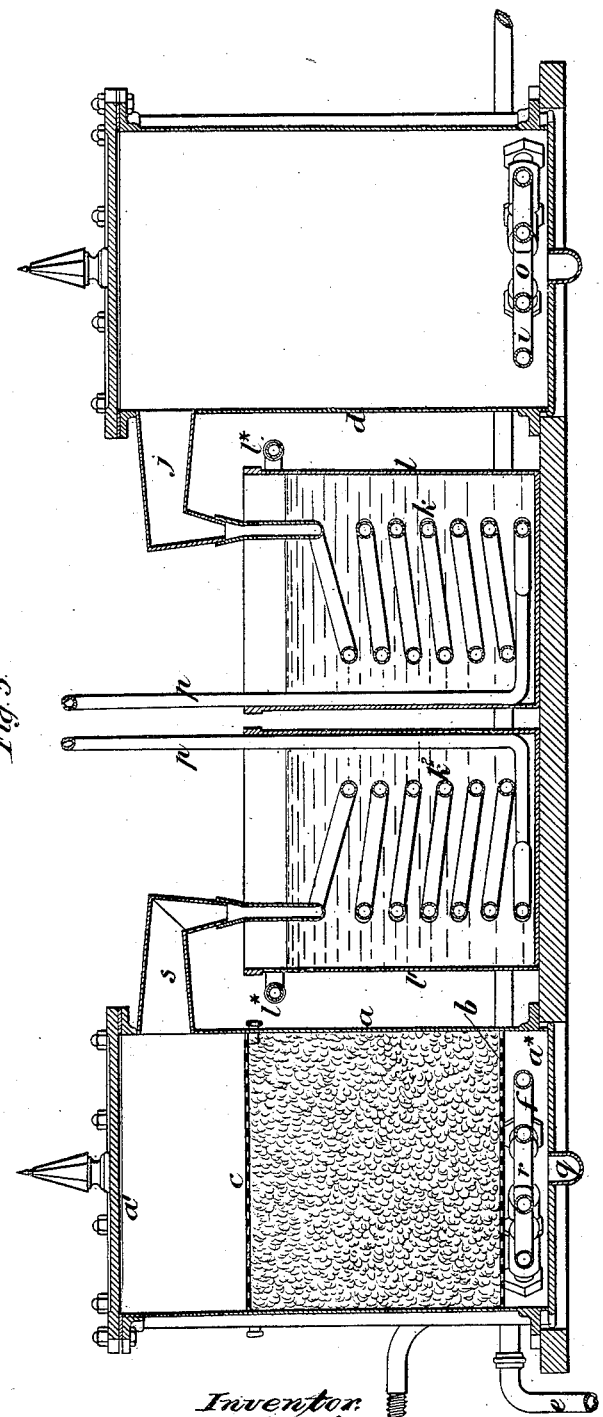

UNITED STATES PATENT OFFICE.

CHARLES T. BASTAND, OF LONDON, ENGLAND.

PROCESS OF AND APPARATUS FOR EXTRACTING OILY AND GREASY MATTER FROM COTTON WASTE.

SPECIFICATION forming part of Letters Patent No. 245,765, dated August 16, 1881.

Application filed June 7, 1881. (No model.) Patented in Great Britain November 13, 1880.

*To all whom it may concern:*

Be it known that I, CHARLES TALMAGE BASTAND, of London, England, have invented a new and useful Improved Process of and Apparatus for Extracting Oily and Greasy Matter from Cotton Waste, for cleansing the same and obtaining a product which may be utilized for various purposes, (for which I have obtained a patent in Great Britain, No. 4,693, bearing date November 13, 1880,) of which the following is a specification, reference being had to the accompanying drawings.

My invention relates to an improved process or method of and apparatus for the extraction of oily and greasy matter from engineers' cotton waste, so as to cleanse the same and render it fit for reuse, the product obtained by such extraction being especially applicable in the manufacture of printing-ink. This product may, moreover, be utilized for coating hempen or cotton fabrics to render them water-proof—that is to say, it may be utilized in the manufacture of tarpaulin and the like.

The said invention consists in subjecting the oily or greasy cotton waste, in the state in which it is commonly left after use, to the action of bisulphide of carbon in a closed vessel, or to the action of ether or other volatile liquid which has an affinity for oil and which will vaporize at a lower temperature than that at which the oil or grease contained in the waste will vaporize. I prefer, however, to use bisulphide of carbon by reason of its cheapness as compared with other liquids having the same properties. This bisulphide of carbon is caused to saturate the mass of waste contained in the closed vessel, and flows with the oil or grease which it abstracts or takes up through suitable connections into a second vessel, in which the mixture of bisulphide of carbon and oil is subjected to heat to cause the former to vaporize. This bisulphide of carbon when thus vaporized passes through suitable pipes to condenser-coils, where it is condensed, and is thence conducted back to the supply tank or receptacle to be again used. The oil or grease then left in the said vessel is drawn off, and may be advantageously employed for the manufacture of printing-ink or for other purposes, as above stated. The bisulphide of carbon remaining in the cotton waste is then vaporized, and the latter will then be found free from oil, and will only require washing in cold water, drying, and beating or opening to again fit it for use.

My invention is illustrated in the accompanying drawings, in which Figure 1 is a plan of my improved apparatus with the cover of the cylinder or vessel for containing the cotton waste removed, and also the perforated plates employed therein, and with the cover of the vaporizing vessel or cylinder also removed; and Fig. 2 a front elevation of said apparatus. Fig. 3 is a longitudinal vertical section of the apparatus on the line $x\ x$, Fig. 1.

Like letters indicate the same parts throughout the drawings.

$a$ is the vessel for containing the cotton waste. $b$ and $c$ are perforated plates therein. $d$ is the vaporizing-vessel. $e$ is a pipe through which the bisulphide of carbon is injected into the vessel $a$. $f$ is an unperforated steam coil or pipe for vaporizing such bisulphide of carbon. $g$ represents a cock arranged in the pipe $h$, through which the bisulphide of carbon mixed with the oil or grease flows to the vaporizing-vessel. $i$ is an unperforated steam coil or pipe for heating the mixture of bisulphide of carbon and oil or grease in the vessel $d$. $j\ j$ are outlet-pipes extending from the latter to the condenser-coils $k$. $l\ l$ are the water-tanks inclosing these coils and supplied with water through pipes $m$. $n$ is a cock for drawing off the oil and grease from the vessel $d$. $o$ is a perforated steam-pipe through which steam is passed to effect the agitation of the contents of the vessel $d$. $p\ p$ are vent-pipes to carry off noxious gases. $q$ is the outlet-pipe for drawing off the bisulphide of carbon from the vessel $a$. $r$ is a perforated steam-pipe in the bottom of the latter, and $s\ s$ are outlet-pipes extending from the said vessel $a$ and communicating with condensing-coils $k^2$. The remaining parts are hereinafter described.

In carrying my invention into practice I arrange within the vessel or cylinder $a$, and near the bottom thereof, the perforated plate or disk $b$, upon which I place the greasy cotton waste, and I fill such cylinder to a convenient height and then place over the same the perforated plate $c$, which is preferably covered with or is placed over canvas, cocoa-nut matting, or other filtering material to prevent the passage, with the mixture of oil and bisulphide of carbon, of chips, turnings, or small particles of metal into the vessel $d$, hereinafter described. When this perforated plate is in place I secure the cover $a'$ upon the cylinder or vessel $a$ in an air-tight manner. I then force through the pipe $e$, by a suitable pump, a quantity of bisulphide of carbon, which enters the space $a^*$, between the bottom of the cylinder $a$ and the perforated plate $b$. This bisulphide of carbon is then vaporized by admitting steam from any suitable generator to the steam-coil $f$, arranged below the said perforated plate $b$. The bisulphide of carbon is thus vaporized by the heat evolved from the said coil $f$, and permeates, softens, and heats the mass of waste above the plate $b$. After this vaporization of the bisulphide of carbon the steam is shut off from the said coil $f$ and the cock $g$ in the pipe $h$ is opened. The said pipe communicates with the vaporizing-vessel $d$ and enters the cylinder $a$ at a point above the upper perforated plate, $c$, as shown. A further quantity of bisulphide of carbon now forced into the cylinder $a$ saturates and passes through the waste contained therein and takes up the oil and fatty matter, and as the injection of the bisulphide of carbon is continued it passes through the plate $c$, and flows with the oil through the pipe $h$ into the vaporizing-vessel $d$. When it is found by means of a suitable test-cock at $h'$ that the bisulphide of carbon has abstracted all of the oil or grease from the cotton waste, and that the bisulphide is passing into the vaporizing-vessel $d$ free from oil or grease, I shut the aforesaid cock $g$, thereby closing all communication between the vessel $a$ containing the waste and the said vaporizing-vessel $d$. Within the latter, and near its bottom, I arrange the steam coil or pipe $i$, to which steam is admitted at the same time that the aforesaid cock $g$ is opened, so that when the mixture of oil and bisulphide of carbon enters the said vessel it will become heated, and the bisulphide of carbon will be vaporized and pass off through the outlet-pipes $j$ to the condensers or condenser-coils $k$. These coils are arranged in the tanks $l$, supplied from any suitable source with cold water through the pipes $m$, extending down to or nearly to the bottom of the said tanks, which are provided at their upper ends with suitable overflow-pipes, $l^*$. The admission of steam to the heating-coil $i$ is continued until it is ascertained by means of a test-cock, $d'$, that the bisulphide of carbon is entirely evaporated.

To insure the vaporization of any bisulphide of carbon which might remain intimately commingled with the oil in the vaporizing-vessel $d$, I arrange at the bottom of the said vessel the steam-pipe $o$, which is perforated, as shown, so that steam admitted thereto will enter the mixture of bisulphide of carbon and oil or grease and violently agitate and insure the proper heating of the whole of the same. The oil and grease, after such vaporization of the bisulphide of carbon or other volatile liquid, are left in the bottom of the cylinder or vessel $d$, and may be drawn off into any suitable receptacle through the cock $n$ and used for either of the purposes above specified. The bisulphide of carbon condensed in the condensers $k$ is conducted back by the pipes $k'$ into the supply-tank to be again used, or into any other suitable receptacle.

I connect to the lower end of the condensing-coils $k\ k^2$ suitable vent-pipes, $p$, to carry off any noxious fumes or gases which will not condense, and to prevent the occurrence of a vacuum in such coils. Instead of employing one pipe $h$, I in some cases use two or more of such pipes, each pipe being provided with a cock, as above described.

In order to remove the bisulphide of carbon left in the vessel $a$ containing the waste, after the closing of the cock or cocks $g$ in the pipe or pipes $h$, I provide the bottom of the said vessel $a$ with the outlet-pipe $q$, the passage of liquid through which is controlled by a cock, $q'$, which, when opened, allows the bisulphide of carbon to flow back into the supply-tank. To then vaporize the bisulphide of carbon with which the waste is saturated I admit steam through the perforated coil $r$ into the vessel $a$ in a similar manner to that above described with reference to the pipe $o$ in the vaporizing-vessel $d$. The cotton waste is thus heated, and the bisulphide of carbon is vaporized and passes off through the pipes or outlets $s$ to the condenser-coils $k^2$, (which are arranged in tanks $l'$, similar to the tanks $l$ above described,) and is there condensed and finally conducted to the supply-tank. The lid or cover of the vessel $a$ containing the cotton-waste may then be removed, and the waste, when taken out, will be found perfectly free from oil or greasy matter. It is then washed or rinsed in cold water, dried, and, if desired, subjected in a suitable machine to a beating or opening operation, after which it will be found ready for reuse.

By the employment of a cock, $g$, in the pipe or pipes $h$, I am enabled at any time to open or close the communication between the vessels $a$ and $d$, so that the vaporization of the bisulphide of carbon in the vessel $d$ can be proceeded with when the vessel $a$ is being charged or emptied, a great saving of time being thus effected.

What I claim is—

1. The process, substantially as described, of extracting greasy matters from cotton waste, the same consisting in first passing bisulphide of carbon up through the waste, then heating it until the grease is softened, then drawing off the bisulphide of carbon and dissolved greasy matter to a still, and then repeating the above steps until all the greasy matter is extracted, and, finally, distilling the bisulphide of carbon from the greasy matter and any remaining traces from the waste, and condensing and saving the vapors, substantially as specified.

2. In an apparatus for extracting greasy matter from cotton waste, the combination of the digesting-vessel provided with foraminous partitions, between which the waste is confined, the perforated and unperforated coils for heating said vessel, the pipe leading to the still and provided with a stop-cock for conveying the liquid intermittently to the still, the perforated and unperforated coil for heating the still, and the condensers for condensing the vapors and saving the liquid, as specified.

CHARLES TALMAGE BASTAND.

Witnesses:
 LEWIS SANDERSON,
 P. DEVIN.